Nov. 22, 1927.
B. HILDEBRAND
1,650,514
PROCESS OF DEHYDRATING OIL
Filed April 2, 1925
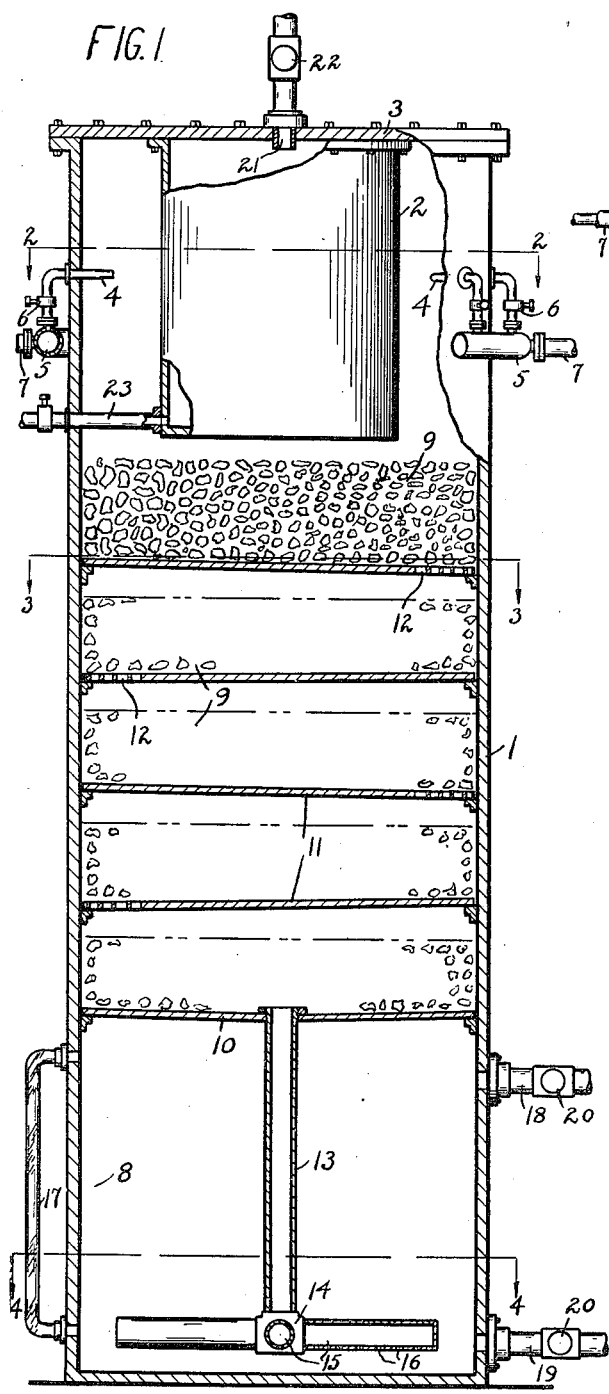
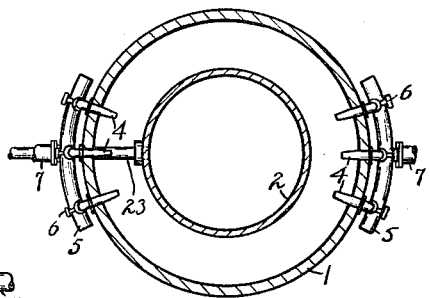
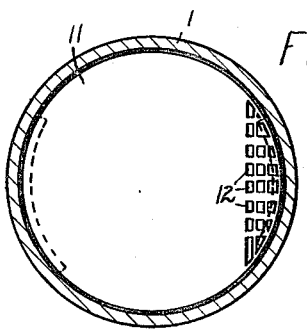
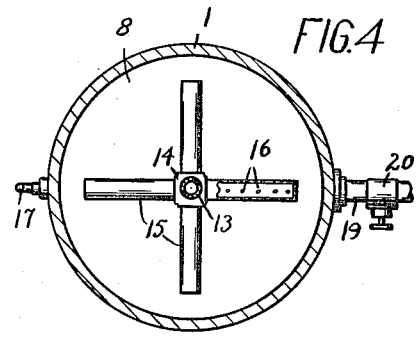
INVENTOR
BUD HILDEBRAND
BY R. W. Smith
ATTORNEY.

Patented Nov. 22, 1927.

UNITED STATES PATENT OFFICE.

BUD HILDEBRAND, OF LONG BEACH, CALIFORNIA.

PROCESS OF DEHYDRATING OIL.

Application filed April 2, 1925. Serial No. 20,054.

This invention is a process of dehydrating crude oil, and it is the object of the invention to mechanically break up the globules of emulsion which consist of films of oil forming around minute drops of water, and then segregating and finally separating the oil and water.

More particularly it is the object of the invention to break up the globules of emulsion by forcible impact against an abutment surface, and to then segregate the oil and water by movement through restricted apertures, with the oil and water finally separated by gravity.

It is a further object of the invention to cause all of the oil to rise through the body of water which settles therefrom after elimination of emulsion, so that the oil will be washed clean of grit and other foreign matter.

It is a still further object of the invention to break up the emulsion in the flow, either with or without the use of heat, as is found the more efficient with the particular oil being treated.

The invention will be readily understood from the following description of the accompanying drawings showing the preferred apparatus for carrying out the improved process.

Fig. 1 is a vertical section through the apparatus.

Figs. 2, 3, and 4 are transverse sections on the lines 2—2, 3—3, and 4—4 of Fig. 1 respectively.

The apparatus comprises a closed tank 1, in which is arranged suitable impact means for the emulsified crude oil entering the dehydrater, the tank also including means for heating the oil when found expedient, means for passing the resulting product through restricted spaces for segregating the oil and water, and a settling chamber for gravity separation of the oil and water.

The impact means for the incoming flow comprises a closed chamber 2 in tank 1 and spaced from the wall thereof, said chamber and the tank being preferably round in cross-section with chamber 2 depending from a cover plate 3 for the tank. The flow of emulsified oil which is to be treated is discharged against the side of chamber 2 so as to break up the globules of emulsion by forcible impact, thereby segregating the oil and water so that they may readily separate by gravity.

The means for discharging the flow against the wall of chamber 2 comprises nozzles 4 extending through the wall of tank 1, with their discharge orifices spaced from the wall of chamber 2 and adapted for discharge directly against the same. In the present instance a plurality of nozzles 4 are employed at opposite sides of tank 1, with said nozzles circumferentially spaced and fixed to arcuate manifolds 5 at the exterior of tank 1, so that the nozzles may be independently removed and replaced. A valvular control 6 at the exterior of tank 1 is preferably provided for each nozzle.

The oil to be treated is supplied to manifolds 5 by suitable pipes 7, the flow being forced through the supply means by suitable mechanism such as a compressor (not shown), so as to discharge the emulsified oil through nozzles 4 and against the wall of chamber 2, with sufficient force to break up the globules of emulsion by impact.

The drops of water are thus liberated from the enveloping films of oil which form the emulsion in the flow, and the segregated oil and water then pass downwardly through tank 1 to a settling chamber 8 in the bottom of tank 1, where the oil and water readily separate by gravity.

After impact of the emulsified oil against the wall of chamber 2, it is preferably passed through restricted spaces for segregating the oil and water. For this purpose crushed rock or the like shown at 9, is supported on baffle means in tank 1 between the chamber 2 and the settling chamber 8; and as the oil and water flow through the restricted spaces formed by the particles of crushed rock they are segregated before discharge to the settling chamber.

The rock-supporting baffle from which the flow discharges to the settling chamber is shown at 10, and may be the only baffle employed; or a plurality of baffles 11 may be mounted in vertically spaced relation above baffle 10, with a layer of crushed rock 9 on each of said baffles.

The superimposed baffles 11 are arranged for flow from each of the same to the next lower baffle, and in opposite directions across succeeding lower baffles, to provide a tortuous flow before discharge onto baffle 10 and into the settling chamber. For this purpose baffles 11 are provided with perforated discharge ports 12 at opposite sides of succeeding lower baffles, the perforated ports preventing dislodgement of the crushed rock carried by the baffles while permitting the free flow of oil and water therethrough.

The flow is discharged from baffle 10 into settling chamber 8 through a conduit 13, which depends from and opens through said baffle, preferably at its center. A coupling 14 on the lower end of the conduit supports radially extending pipes 15, which are closed at their outer ends and provided with perforations 16 at their undersides adjacent the bottom of tank 1, for discharge of the flow into the settling chamber.

The oil and water of the flow will readily separate when held in a quiescent state in the settling chamber, the water gravitating to the bottom of the settling chamber, and the oil rising above the same. The discharge perforations 16 being at the bottom of the settling chamber, all of the oil will pass through the body of water as it rises therefrom, in order to wash the oil clean of grit or the like.

The oil and water in the settling chamber is gauged by a usual sight glass 17 on the exterior of tank 1; and the oil and water may be separately withdrawn through conduits 18 and 19 communicating with the settling chamber at the top and bottom thereof respectively. The discharge of oil and water is controlled by suitable valve means 20 in the respective conduits.

Dehydration by the process described may be carried on with or without heat, as is found desirable for the oil being treated. Heating is accomplished by utilizing chamber 2 as a steam chamber; and for this purpose a steam supply pipe 21 having a valvular control 22, communicates with the top of chamber 2, and a steam discharge pipe 23 extends from the bottom of said chamber and outwardly through tank 1.

For some oil it has been found that impact thereof against the wall of chamber 2, with the latter heated to a suitable degree by the passage of steam therethrough, increases the efficiency of the apparatus as a means for breaking up emulsion in the oil, but if found desirable the device may be used without heating the chamber 2, simply by closing the valve 22.

The initial compression of the emulsified oil as it is forced through the supply pipes, and the subsequent rapid expansion and impact thereof as it is discharged from nozzles 4, will break up the globules of emulsion in the flow; and the subsequent passage of the flow through restricted spaces segregates the oil and water so that they are adapted for thorough gravity separation when finally discharged into the settling chamber.

I claim:

1. The process of separating emulsified oil and water, which consists in compressing the emulsion and then expanding the same and causing forcible impact thereof against a heated surface, then passing the emulsion in a tortuous course through restricted spaces between particles of succeeding layers of finely divided material, and finally settling the emulsion so as to cause all of the oil to rise through the water.

2. The process of separating emulsified oil and water which consists in discharging the emulsion against a heated impact surface, then passing the emulsion in a tortuous course through restricted spaces, and finally settling the emulsion and passing the segregated oil through the water.

In testimony whereof I have affixed my signature to this specification.

BUD HILDEBRAND.